March 8, 1949.   B. E. LUBOSHEZ   2,464,138
NONINTERMITTENT TAKING OR PROJECTION
OF MOTION PICTURES
Filed Feb. 27, 1947   2 Sheets-Sheet 1

Fig. 1.
PRIOR ART

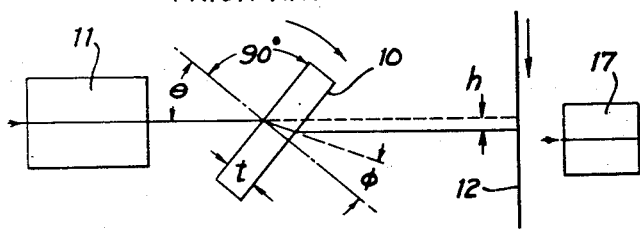

$$\sin \theta = N \cdot \sin \phi \quad \text{---(1)}$$
$$h = t \cdot \sin(\theta - \phi)/\cos \phi \quad \text{---(2)}$$
$$= t \cdot \sin\theta(1 - \cos\theta/\sqrt{N^2 - \sin^2\theta})$$

Expanding and neglecting terms above $\theta^3$,
$$h = \frac{t(n-1)}{n}\theta\left(1 - \frac{N^3 - 3N - 3}{6N^2}\theta^2\right) \quad \text{---(3)}$$

Let $K_1 = \frac{N-1}{N}$, and $K_2 = \frac{N^3 - 3N - 3}{6N^2}$ then
$$h = t \cdot K_1 \cdot \theta(1 - K_2 \theta^2) \quad \text{---(4)}$$
$$dh/d\theta = t \cdot K_1(1 - 3K_2 \theta^2) \quad \text{---(5)}$$

Fig. 2.

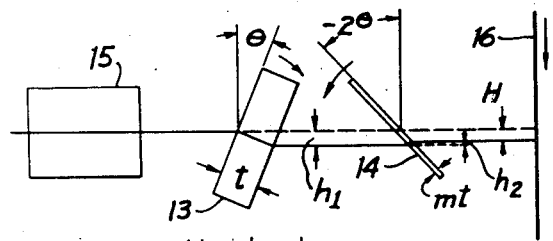

$$H = h_1 - h_2$$

From (4)[Fig.1] with plates of the same glass:
$$h_1 = t \cdot K_1 \cdot \theta(1 - K_2 \theta^2)$$
and $h_2 = m \cdot t \cdot K_1 \cdot 2\theta(1 - 4 \cdot K_2 \theta^2)$
$$\therefore H = tK_1\theta(1 - K_2\theta^2) - mtK_1 2\theta(1 - 4K_2\theta^2)$$

For constant rate of change of $H$ with $\theta$,
$$d^2H/d\theta^2 = tK_1K_2\theta - 8mtK_1K_2\theta = 0$$

Hence $m = 1/8$

Fig. 3.

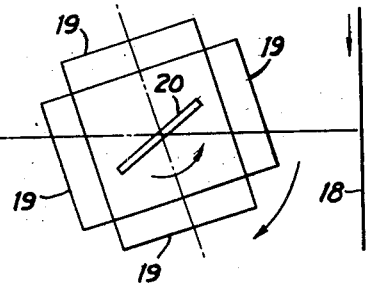

Fig. 4.

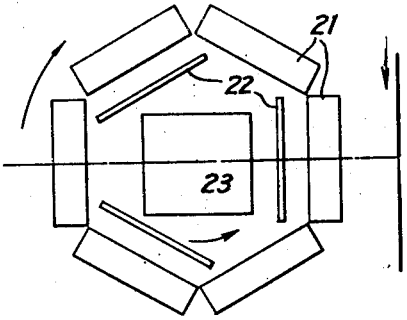

Benjamin E. Luboshez
INVENTOR

BY
ATTORNEYS

March 8, 1949.  B. E. LUBOSHEZ  2,464,138
NONINTERMITTENT TAKING OR PROJECTION
OF MOTION PICTURES
Filed Feb. 27, 1947  2 Sheets-Sheet 2

Benjamin E. Luboshez
INVENTOR
BY
ATTORNEYS

Patented Mar. 8, 1949

2,464,138

UNITED STATES PATENT OFFICE 2,464,138

NONINTERMITTENT TAKING OR PROJECTION OF MOTION PICTURES

Benjamin E. Luboshez, Rochester, N. Y., assignor to Eastman Kodak Company, Rochester, N. Y., a corporation of New Jersey Application February 27, 1947, Serial No. 731,205

5 Claims. (Cl. 88—16.8)

This invention relates to taking or projecting motion pictures and more particularly to a method and apparatus of the type in which the film is moved continuously rather than intermittently.

It has long been considered desirable to have motion picture apparatus in which all moving parts have uniform circular motion but, except for certain specialized purposes, no apparatus has been designed which is competitive in performance and cost with apparatus through which the film is moved intermittently. The reason for this is primarily due to the failure to devise simple and relatively inexpensive optical compensating means, without reciprocating parts, capable of giving linear optical correction over large displacement. This limitation to small angles seriously limits the proportion of total time available for the transmission of light which in the case of cameras is too serious for most practical uses and in the case of projectors makes it difficult to eliminate flicker.

In applications where short exposure times can be tolerated, the rotating parallel plate method of compensation has been practical as well as extremely simple. In this method a parallel plate of glass of suitable thickness and index of refraction is located between the objective and its focal plane so that when it is rotated at uniform angular velocity in synchronism with the movement of the film in the gate axial rays through the objective follow the movement of the film over small angles from the position where the axial rays are orthogonal to the plate with sufficient uniformity for practical purposes.

The angle through which the plate can be usefully employed is further limited by the aberrations the plate introduces in the image plane. The spherical aberration which is present when the plate is in the orthogonal position can be allowed for in the design of the objective but the astigmatism and distortion introduced by the inclined plate cannot be brought under control in that way.

The primary object of the present invention is the provision of an arrangement which will give satisfactory optical compensation over substantial angles.

Another object of the invention is to provide an optical compensating system of the rotating parallel plate type which will give substantially linear displacement over large angles and at the same time provide some correction for astigmatism and distortion.

Other objects and advantages of the invention will appear from the following description when read in connection with the accompanying drawings and its scope will be pointed out in the appended claims.

According to the invention the lack of linearity between the angle of rotation of a parallel plate and the image displacement produced thereby is compensated by an oppositely rotating parallel plate. In the preferred form of the invention the principal plate is rotated so as to make half a turn per picture frame and the thinner auxiliary plate is rotated at twice this speed and in the opposite direction. Whenever the auxiliary plate has turned beyond a predetermined angle from its orthogonal position, the light is of course shut off by some suitable arrangement such as the disc or barrel shutters of Patent No. 2,008,973 to Tuttle.

In the drawings:

Fig. 1 is a diagrammatic view showing the refraction of a ray by a plane parallel plate;

Fig. 2 is a similar diagrammatic view showing a twin plate arrangement according to the invention;

Fig. 3 shows diagrammatically an auxiliary plate arranged for rotation inside a rotatable hollow cube;

Fig. 4 shows the invention embodied in rings of plates;

Figure 6:
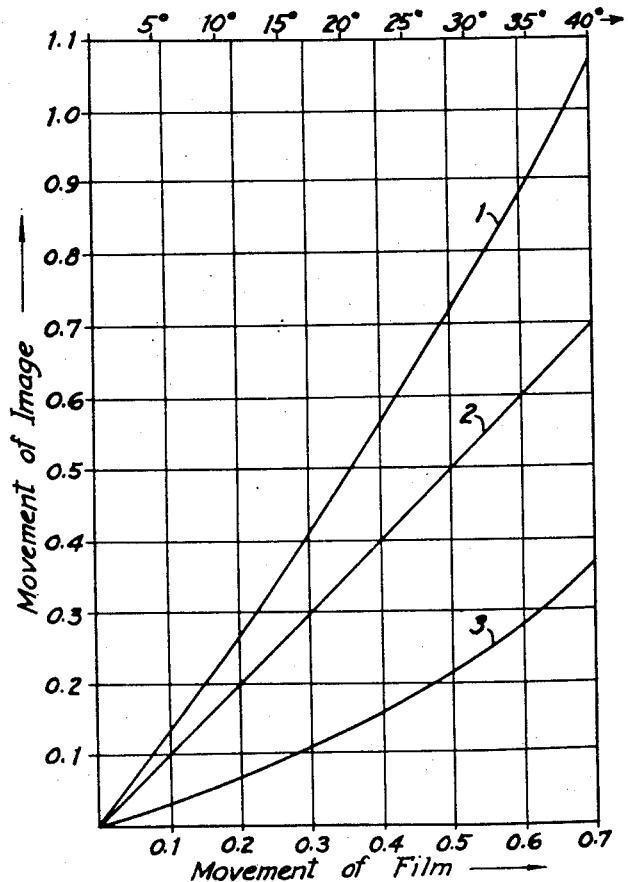
Fig. 6 is a graphical representation of the displacements produced by the individual plates of Fig. 2 and the net displacement resulting from the combined action of the two plates.

The diagram of Fig. 1 illustrates the well-known arrangement of a single plane parallel plate 10 positioned to rotate between an objective 11 and its focal plane 12 along which a film is to be uniformly moved. If, as is indicated, light passes serially through the objective 11 and the plate 10 to the focal plane 12, the axial ray will proceed in a straight line when the plate 10 is orthogonal to this ray and when the plate 10 has been rotated through an angle $\theta$ the axial ray will be refracted and pass through the plate 10 at an angle $\phi$ to the normal to emerge parallel to but displaced by a distance $h$ from its straight line position. If this displacement were a linear function of the angular rotation of the plate 10, it would be a simple matter to find the proper speed for a uniformly moving film to follow exactly the image displacement. In other words the rate of change of $h$ with $\theta$ would be a constant. However, it will be seen from the mathematical analysis associated with Fig. 1 that the movement of the image can never be exactly proportional to the angle through which the plate 10 is rotated, but by limiting this angle to small enough values any degree of approximation to true proportionality can be obtained. The true character of the relation between the movement of the image and the movement of the film, i. e., the angle of the plate, is graphically shown in curve 1 of Fig. 6.

The above analysis of a single plate known to the art will aid in the understanding of the present invention which in substance introduces a second plate of the proper thickness to provide a net displacement of the image which is linear with respect to the angle of rotation of the plate. This second plate is rotated at a higher speed than the primary plate and in the opposite direction. In the preferred simple form of the invention shown in Fig. 2 a primary plate 13 and an auxiliary plate 14 are positioned for opposite rotation between an objective 15 and its focal plane 16 along which the film is to be moved.

The mathematical analysis associated with Fig. 2 shows the derivation of the requirement that the auxiliary plate 14 should be one-eighth as thick as the primary plate 13. This ratio applies only when the same kind of glass is employed in both the plates 13 and 14 but it is quite simple to calculate the thicknesses when glasses differing in refractive indices are used. With the auxiliary plate 14 rotating at twice the speed of the primary plate 13 it will function to displace the image as shown in the curve 3 of Fig. 6 and the net or resultant image displacement will be the difference between the two curves 1 and 3 as shown by the curve 2.

The thickness $t$ of the primary plate 13 was chosen so that the movements of the film and image in the resultant curve 2 would be identical at 0.5 on the scale. It will be seen, however, that the linear relationship is so perfect throughout the range as to be true at all points within the accuracy of the calculations. There is no visible deviation from the linear relationship even at 0.7 on the scale and this corresponds to an angle of about 40 degrees for the primary plate 13 and 80 degrees for the auxiliary plate 14.

Figure 5:
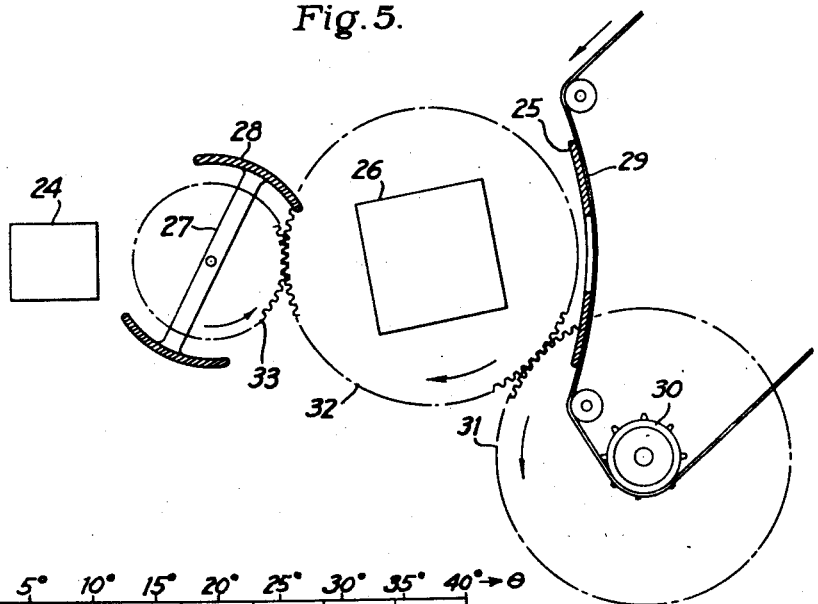
Fig. 5 shows an arrangement in which one of the twin plates is an optical cube.

Although two plates as above described are preferred, the invention may take other forms such as are illustrated in Figs. 3, 4 and 5. In Fig. 3, between an objective 17 and its film plane 18 there is positioned a hollow cube made up of four identical plates 19 each of which is one-half the thickness of the equivalent single primary plate. Within the hollow cube is arranged a thin auxiliary plate 20 which functions the same as the plate 14 in Fig. 2. Here again the ratio of the thicknesses of the primary and auxiliary plates is 8:1 and upon rotation of the plate 20 in a direction opposite to and at twice the speed of the primary plates 19 the resultant image displacement remains proportional to the angular displacement of the primary plates 19 as was the case with the arrangement shown in Fig. 2.

In the embodiment shown in Fig. 4 two rings of plates 21 and 22 are arranged to rotate around an objective 23. In this case the inner ring contains three auxiliary plates 22 which are adapted to rotate at twice the speed and in the opposite direction to the outer ring of primary plates 21. The thickness ratio is again 1:8 and the image displacement is linear with the angle of movement of the primary plates 21. For many purposes the passage of the plates 21 and 22 in front of the objective 23 introduces no sensible errors but if desired, a prism or mirror may be positioned immediately in front of the objective 23 for deflecting the optic axis at a right angle to the plane of the drawing as is well known.

Although all the forms the invention may take are in general applicable equally to cameras and projectors, the embodiment now to be described in connection with Fig. 5 is a preferred form for projectors. In this embodiment the twin plates between an objective 24 and its film gate 25 comprise a primary plate 26 in the form of a cube and an auxiliary plate 27. The cube plate 26 has four working faces and therefore makes one quarter of a turn for each compensating cycle. The thin plate 27, one-eighth the thickness of the cube plate 26, rotates at twice the speed of the plate 26 by rotating only 180 degrees per cycle. Thus the rotating parts are never in very rapid motion. One advantage of this arrangement lies in the fact that it is possible to equalize the periods during which light and darkness appear on the projector screen and thus minimize flicker. For example, a shutter might consist of a section of a tube 28 surrounding the ends of the thin plate 27 similar to the one shown in the above-mentioned Tuttle patent.

In the arrangement shown in Fig. 5, a film 29 may be drawn continuously past the gate 25 by a suitable sprocket 30 and in proper time relation with the plates 26 and 27 through gears 31, 32 and 33. As illustrated, the sprocket 30 has teeth representing four motion picture frames so that a 1:1 ratio between gears 31 and 32 and a 2:1 ratio between gears 32 and 33 will provide the required synchronism for the moving parts.

It is to be understood that in all the modifications of the invention, the ratio of the angular speeds of the two plates need not be two to one although in practice it is the most convenient arrangement. For other speed ratios the relative thicknesses of the two plates would have to be calculated by the equations given in Fig. 2.

The drawings have purposely been made diagrammatic and to include only those features necessary to a complete understanding of the invention. Illustration of the many obvious arrangements suitable for rotating the compensating plates in the required time relation and in synchronism with a film would serve to obscure the invention by complicating the drawings without giving practical aid to one skilled in the art wishing to make use of the invention.

Although several specific arrangements have been described which are suitable for practicing the invention, it is to be understood that many modifications may be made therein and the method of the invention carried out by other means without departing from the scope of the invention as pointed out in the appended claims.

I claim:

1. In motion picture apparatus of the type in which the film is advanced continuously, an optical system including a stationary objective lens having a long optical side and a short optical side, two plane parallel refracting members rotatable on the short optical side of the lens, and means for rotating said refracting members in opposite directions and at different speeds, the slower speed refracting member being substantially thicker than the faster speed refracting member.

2. In an optical system for obtaining a stationary image from a moving one, or vice versa, the combination with an objective of a primary planar refracting member uniformly rotatable in one direction and an auxiliary planar refracting member uniformly rotatable in the other direction with an angular speed twice that of the primary refracting member, the optical thickness of said auxiliary member being one-eighth the optical thickness of the primary refracting member.

3. In an optical rectifying system for displacing a light beam at a desired uniform rate, a primary refractive member rotatable in the light beam and having an optical thickness sufficient to displace the beam faster than the desired rate, means for rotating said primary member at a constant speed in one direction, an auxiliary refractive member rotatable in the light beam, and means for rotating said auxiliary member in the opposite direction and at a speed which is an integral multiple of the speed of said primary member, the optical thicknesses of the two members being in inverse cubic relation to their respective speeds.

4. The optical system of claim 3 wherein the primary refracting member comprises a hollow cube surrounding the auxiliary planar refracting member.

5. The apparatus of claim 1 wherein the slower speed refracting member is a cube having four effective surfaces.

BENJAMIN E. LUBOSHEZ.

REFERENCES CITED

The following references are of record in the file of this patent:

UNITED STATES PATENTS

| Number | Name | Date |
| --- | --- | --- |
| 2,352,214 | Ligh | June 27, 1944 |

FOREIGN PATENTS

| Number | Country | Date |
| --- | --- | --- |
| 265,291 | Great Britain | Feb. 4, 1927 |